United States Patent [19]

Crisp

[11] Patent Number: 4,765,559
[45] Date of Patent: Aug. 23, 1988

[54] SYNCHRONIZED SAFETY BELT RETRACTOR WITH STRUCTURAL CONTROL LOCKING MEANS

[75] Inventor: T. Sam Crisp, Romford, Great Britain

[73] Assignee: American Safety Equipment Corporation, Troy, Mich.

[21] Appl. No.: 71,650

[22] Filed: Jul. 7, 1987

[51] Int. Cl.⁴ .............................................. B60R 22/40
[52] U.S. Cl. .............................................. 242/107.4 A
[58] Field of Search ................. 242/107.4 A, 107.4 B; 280/806, 803; 297/478

[56] References Cited

U.S. PATENT DOCUMENTS

| | | | |
|---|---|---|---|
| 3,578,260 | 5/1971 | Kell | 242/107.4 A |
| 3,834,646 | 9/1974 | Heath | 242/107.4 AX |
| 3,991,953 | 11/1976 | Takada | 242/107.4 A |
| 4,018,400 | 4/1977 | Henderson | 242/107.4 A |
| 4,046,332 | 6/1977 | Wheeler | 242/107.4 A |
| 4,090,678 | 5/1978 | Yamanashi | 242/107.4 A |
| 4,113,200 | 9/1978 | Tanaka | 242/107.4 R |
| 4,162,773 | 7/1979 | Wallin | 242/107.4 A |
| 4,251,091 | 2/1981 | Weissner et al. | 242/107.4 AX |
| 4,337,906 | 7/1982 | Colasanti et al. | 242/107.4 A |
| 4,391,420 | 7/1983 | Ahad | 242/107.4 A |
| 4,492,349 | 1/1985 | Stamboulian | 242/107.4 A |

FOREIGN PATENT DOCUMENTS

| | | | |
|---|---|---|---|
| 52-39219 | 3/1977 | Japan | 242/107.4 A |
| 2070913 | 9/1981 | United Kingdom | 242/107.4 A |

*Primary Examiner*—John M. Jillions
*Attorney, Agent, or Firm*—Poms, Smith, Lande & Rose

[57] ABSTRACT

A structural control locking means for a safety belt retractor having a belt storage spool rotatably mounted on a shaft, the spool having a programming ratchet and a locking ratchet, each ratchet having a respective equal plurality of teeth, and a programming pawl and a locking pawl for preventing spool rotation when engaged with the respective ratchet teeth. The structural control locking means preferably comprises the provision of an actuator means for initiating movement of the programming pawl into engagement with the teeth of the programming ratchet, an inertia sensor means for moving the actuator means and a control means. The control means includes a pawl mounting means for mounting the programming pawl and a driving means for drivingly engaging the locking pawl with the locking ratchet. Exemplary embodiments of the control means include the provision of a substantially bar-shaped configuration having first and second ends, the first end being pivotally connected to the locking pawl by the driving means; and alternately, the provision of a dog having a polygonal configuration including a programming portion and a locking portion. Rotation of the programming ratchet after engagement of the programming pawl with the programming ratchet moves the control means causing synchronized engagement of the locking pawl with the locking ratchet through movement of the driving means thereby preventing further belt protraction.

8 Claims, 8 Drawing Sheets

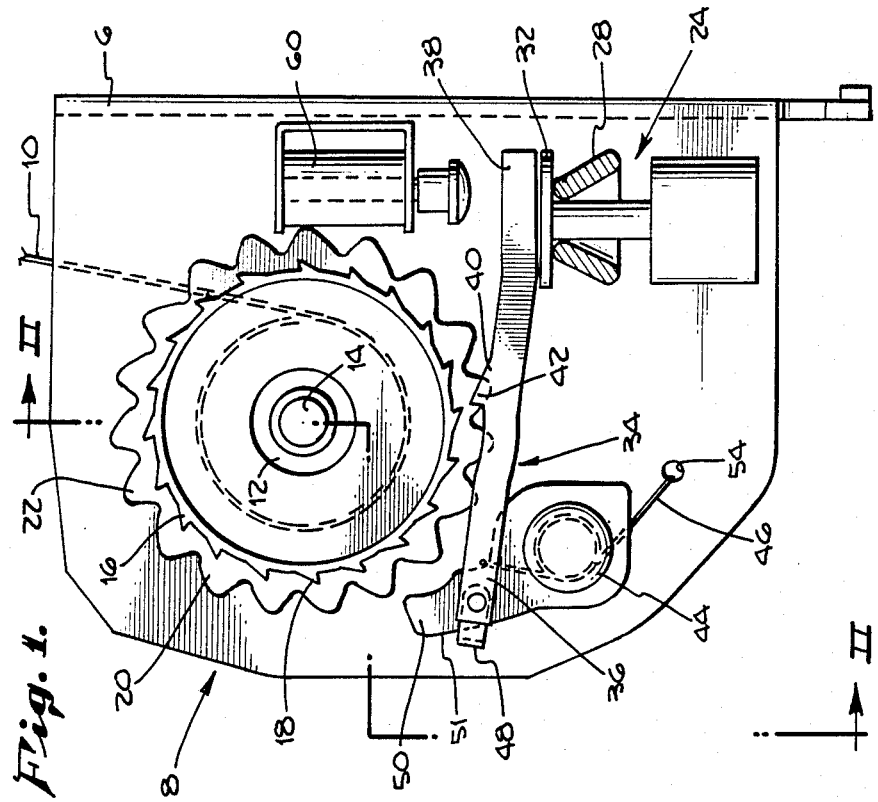
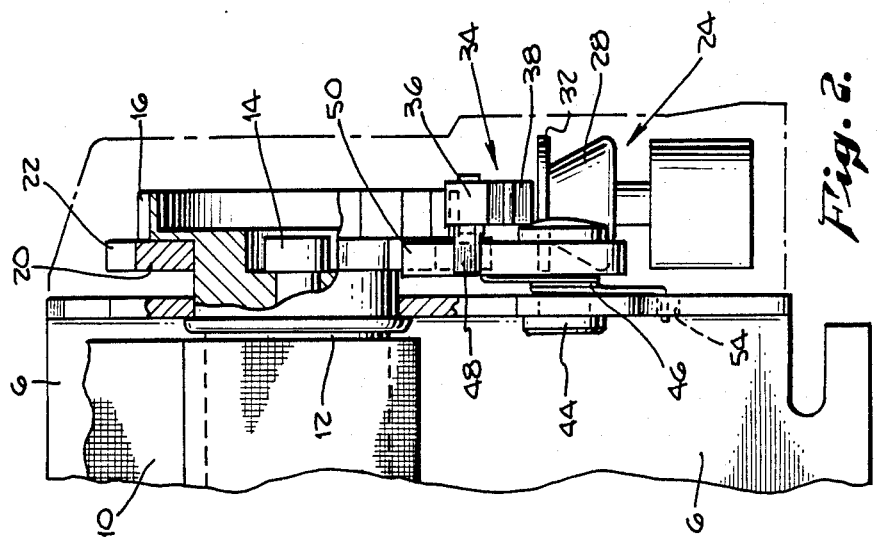

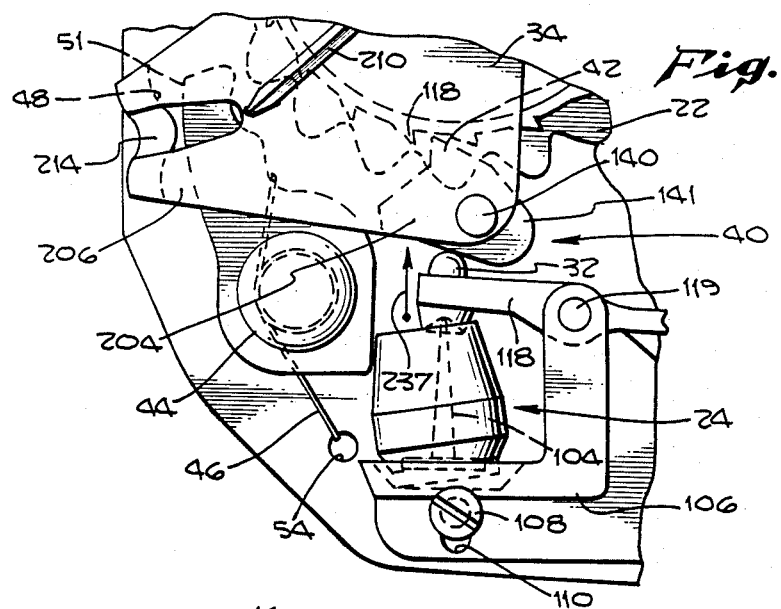
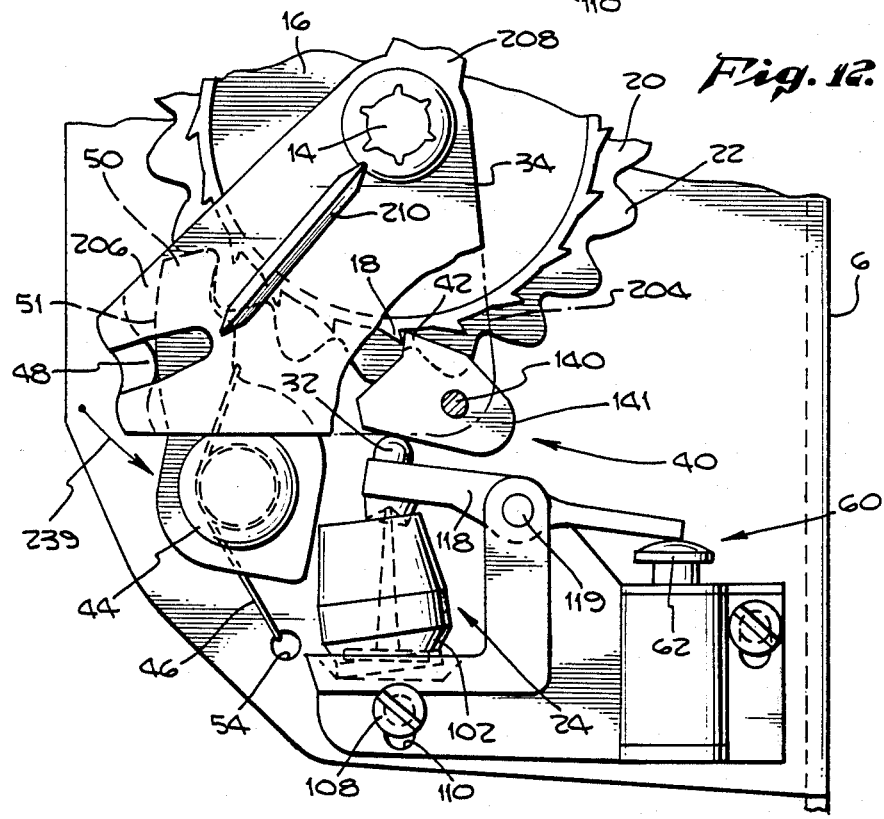

SYNCHRONIZED SAFETY BELT RETRACTOR WITH STRUCTURAL CONTROL LOCKING MEANS

BACKGROUND OF THE INVENTION

The present invention relates in general to safety belt retractors employed in vehicles for retaining passengers in their seats during emergency conditions and more particularly to a structural control means which synchronizes locking engagement of such a safety belt retractor.

In emergency locking retractors of the type typically used with vehicular safety belts, designed to prevent belt protraction under sudden inertial changes, such as collision or sudden stop, it is commonly known to utilize two locking ratchets or wheels on the belt winding spool in order to lock the spool and belt against emergency responsive protraction. The movement of a locking pawl into engagement with the associated locking ratchets has generally been controlled by the engagement of a programming pawl with a programming ratchet mounted to the same spool. The programming pawl may engage the programming ratchet in response to motion of a vehicle inertia sensor or strap acceleration responsive device and, is, thereafter moved by rotation of the programming ratchet due to further spool rotation. Such movement of the programming pawl may be used to actuate the locking pawl into engagement with the locking ratchets whereby further spool rotation and belt protraction is precluded. It is important to the reliability and durability of the retractor that the means for transferring the affect of the programming pawl and programming ratchet lockup to the locking pawl and locking ratchet lockup effect be of a reliable and durable nature.

It is the primary object of the present invention to disclose and provide a synchronized locking retractor of the foregoing type which is actuated into a belt retention mode by a structurally strong control means. More specifically, it is an object of the present invention to disclose and provide a rugged structurally strong control means for synchronizing the engagement of the programming pawl and programming ratchet with the locking pawl and locking ratchet once the programming pawl is engaged in response to an inertia sensor means. Synchronization is effectuated even when subject to great torsional and inertial load from the rotational shaft and the possible abusive loadings that can be generated under severe circumstances in a variety of applications. Further the embodiments reduce variations in synchronization due to component tolerance by minimizing components.

SUMMARY OF THE INVENTION

Generally stated, the present invention includes the provision of a structural control locking means for use in a safety belt retractor having a belt storage spool rotatably mounted on a shaft, the spool having a programming ratchet and a locking ratchet, each ratchet having a respective equal plurality of teeth, and a programming pawl and a locking pawl for preventing spool rotation when engaged with the respective ratchet teeth. The structural control locking means preferably comprises the provision of an actuator means for initiating movement of the programming pawl into engagement with the teeth of the programming ratchet, an inertia sensor means for moving the actuator means and a control means, in a preferred embodiment being of a substantially barshaped configuration, having first and second ends and including a pawl mounting means for mounting the programming pawl. The first end is preferably pivotally connected to the locking pawl by a retaining means for drivingly engaging the locking pawl with the teeth of the locking ratchet. Rotation of the programming ratchet after engagement of the programming pawl with the programming ratchet moves the control means causing synchronized engagement of the locking pawl with the locking ratchet through movement of the driving means thereby preventing further belt protraction. Exemplary embodiments of such control means include the provision of a second end overlying the actuator means and slideably moveable over the actuator means, and the pawl mounting means comprising an integral mid-portion of the control means; and, the second end slideably receivable in a fixed support member, a mid-portion disposed above the sensor means, a control spring means biasing the control means to move the locking pawl away from the locking ratchet, and the pawl mounting means further comprising an actuator mounting arm pivotally connected to the mid-portion of the control means and providing rotational movement of the programming pawl toward engagement with the programming ratchet in response to movement of the sensor means.

In addition, as a further aspect of the present invention, the control means in an alternative embodiment may be a structural dog of a polygonal configuration having a programming portion and a locking portion and including a retaining means comprising an integral first lip on the locking portion for drivingly engaging the locking pawl with the teeth of the locking ratchet, and a pawl mounting means for mounting the programming pawl on the programming portion, whereby rotation of the spool shaft after engagement of the programming pawl and programming ratchet is translated by the control means to synchronize engagement of the locking pawl and locking ratchet thereby preventing further belt protraction. Exemplary embodiments of these such control means include the provisions of a lower dog portion slideably and pivotally mounted on the retractor housing, the first lip on the locking portion situated adjacent to the actuator means, and the pawl mounting means comprising an integral lip of the programming portion of the control means for providing for engagement of the programming pawl with the programming ratchet in response to movement of the first lip of the control means by the actuator means; and, the control means comprising the provision of a central portion rotatably mounted about the spool shaft and overlying the programming ratchet and the locking stabilizing, a ratchet portion extending from the center portion providing structural and rotational integrity.

It is believed that a better understanding of the present invention, as well as a recognition of how the present invention achieves the foregoing objects and attains various additional advantages will become apparent to those skilled in the art from a consideration of the following detailed description of a preferred and several alternative exemplary embodiments of the present invention in action and structural control means for a synchronized safety belt retractor system. During the following detailed descriptions, reference will be made to the appended sheets of the drawings, which will now first be described briefly.

BRIEF DESCRIPTION OF THE DRAWINGS

FIG. 1 is a sectional view of an exemplary synchronized safety belt retractor having a preferred exemplary embodiment of a structural control means in accordance with the present invention;

FIG. 2 is a side view of the exemplary synchronized safety belt retractor and synchronized structural control means of FIG. 1 taken therein along plane II—II;

FIG. 11 is a partial sectional view as in FIG. 9 showing the exemplary synchronized retractor in programming ratchet engaged condition;

FIG. 12 is a view as in FIG. 11 showing the exemplary synchronized retractor in locking ratchet engaged and spool locked condition;

DETAILED DESCRIPTION OF THE INVENTION

Figure 3:
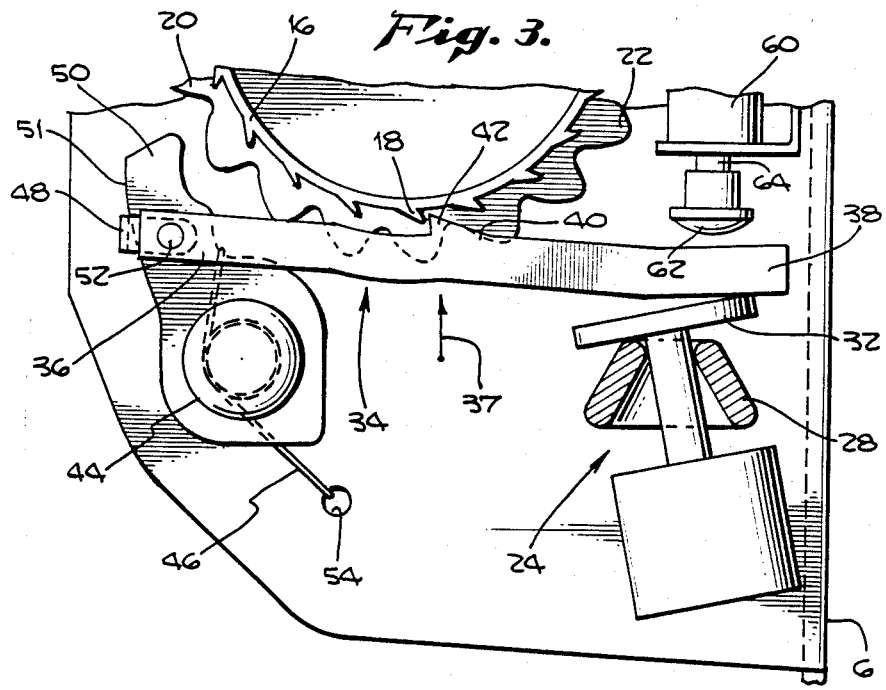
FIG. 3 is a partial sectional view as in FIG. 1 showing the exemplary retractor in programming ratchet engaged condition.

Referring first to FIGS. 1 through 4, a preferred exemplary embodiment of a synchronized safety belt retractor with structural control means, indicated generally at 8, in accordance with the present invention will now be described in detail. A belt storage spool 12 is provided for storing belt webbing 10, and is fixed upon belt shaft 14. Belt shaft 14 is also provided with a programming ratchet 16 and a locking ratchet 20. Ratchets 16 and 20 have an equal plurality of programming teeth 18 and locking teeth 22, respectively. As will be discussed more fully hereinafter in association with this more detailed explanation of the structural control means of the present invention, programming pawl 42 and locking pawl 50 engage the plurality of teeth 18 and 22 by a control means 34 to prevent spool rotation about shaft 14. The storage spool 12 is biased toward a webbing stored condition by, for example, conventional retraction springs (not shown) provided within housing 8 secured to a frame including side wall 6.

As is contemplated within the present invention, control means 34 has a substantially bar-shaped configuration and has first and second ends 36 and 38 respectively. The first end 36 of control means 34 is pivotally connected to the locking pawl 50 by a retaining means 48. As seen in FIGS. 1 through 4, retaining means 48 in the exemplary embodiment is a spring clip pivoted to control means first end 36 for pulling pawl 50 toward ratchet 20. The second end 38 of control means 34 is overlying actuator means 32 and is slideably movable over the actuator means 32. As is apparent from FIG. 1, control means 34 has a generally horizontal orientation. A pawl mounting means 40 is provided for mounting the programming pawl 42 on the control means 34. Pawl mounting means 40 comprises an integral mid-portion of control means 34.

An inertia sensor means 24, in response to a predetermined amount of vehicle movement, swings about its pivot on support funnel 28 whereby actuator means 32 is thrust generally upward. Movement of actuator means 32 causes the second end 38 of control means 34 to slideably move over actuator means 32 (best shown in FIG. 3). As second end 38 moves, the mid-portion of control means 34 moves pivotally about first end 36 and also moves in an upward direction (as indicated by vertical direction arrow 37). Pawl mounting means 40, then, brings programming pawl 42 into engagement with programming teeth 18 of programming ratchet 16 which may be in revolutionary response to protraction of the webbing 10 from spool 12.

Figure 4:
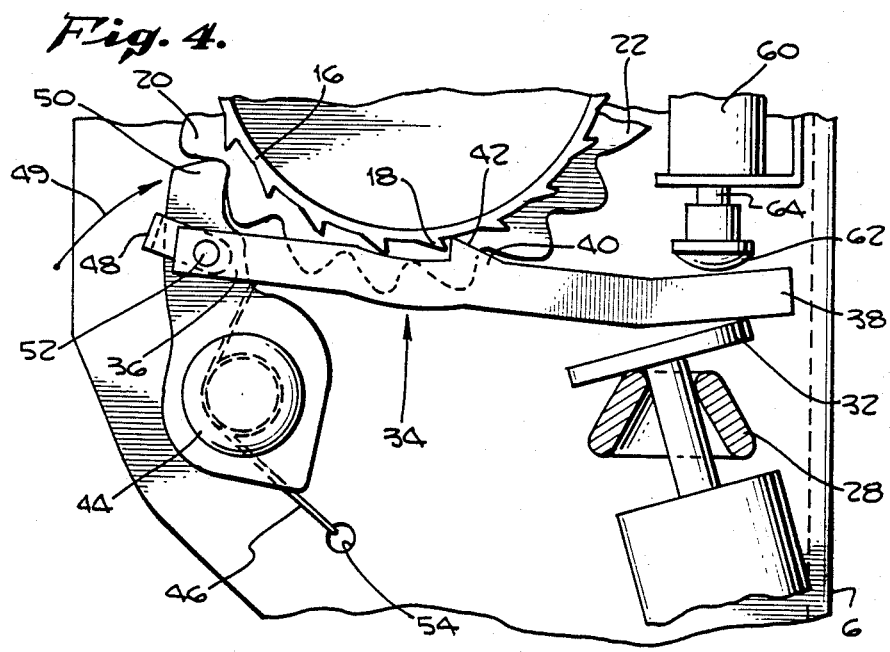
FIG. 4 is a view as in FIG. 4 showing the exemplary retractor in locking ratchet engaged and spool locked condition.

Referring now to FIG. 4, as is particularly contemplated within the present invention, control means 34 is moved complementary to the motion of programming ratchet 16 after the engagement of programming pawl 42 in a counter-clockwise direction. Movement of control means 34 causes first end 36 to piot about pin joint 52. Locking pawl 50 is rotatably mounted about locking pawl shaft 44, and is biased in a position of non-engagement with teeth 22 of locking ratchet 20 by a spring biasing means 46. Spring biasing means 46 is mounted to housing 8 by spring mount 54 (best shown in FIG. 2). Locking pawl 50 is then drivingly engaged with locking teeth 22 in response to the generally horizontal motion of first end 36 (as indicated by directional arrow 49) transmitted to the pawl upper end 51 via the retaining means 48. Engagement with teeth 22 of locking ratchet 18 by locking pawl 50 locks storage spool 12 thereby preventing further protraction of webbing 10. Utilization of control means 34 affords a structural locking means for synchronized engagement. The control means 34 is designed with such structural considerations so as to withstand conceivable abusive loading. As is now apparent to persons skilled in the art, implementation of control means 34 avoids placing structural stresses on the programming pawl or programming ratchet, yet still accomplishes a programmed and synchronized locking of locking pawl 50 with locking ratchet 20 and belt spool 12.

Finally, with respect to the preferred exemplary embodiment, a solenoid means 60 is provided to prevent activation of the retractor system under certain conditions. Blunt end 62 is mounted upon stem 64 and serves to bias second end 38 of control means 34. Restriction of the movement of second end 38 biases against the upward movement of pawl mounting means 40 and prevents premature engagement of programming pawl 42 with programming ratchet 16. Solenoid means 60 may be mounted so as to prevent motion of control means 34 in situations such as a door mounted belt where belt protraction is automatic upon opening of an automobile door, or biased to raise the control means 34 actuation level where desirable.

FIRST ALTERNATIVE EXEMPLARY EMBODIMENT

Referring now to FIGS. 5 through 8, a first alternative exemplary embodiment of a control safety belt retractor is illustrated in association with the embodiment of FIGS. 1-4. The retractor being generally indicated with the same parts having the same reference numerals as the retractor parts heretofore described with regard to FIGS. 1 through 4. In this first alternative embodiment, control means 34 is of a bar-shaped configuration and has a generally horizontal orientation. As in the preferred embodiment, first end 36 of control means 34 is pivotally connected to the locking pawl 50 by a retaining means 48. A pawl mounting means 40 is provided for mounting the programming pawl 42 on control means 34. Pawl mounting means 40 further comprises an actuator arm 141 pivotally connected to the mid-portion of control means 34. Actuator arm 141 provides rotational movement of the programming pawl 42 into engagement with the programming ratchet 16 in response to movement of the actuator means 32.

The mid-portion of control means 34 is disposed above the sensor means 24 and adjacent to the actuator means 32. Second end 38 of control means 34 is slideably receivable in a fixed support member 124. A control spring means 126 is provided so as to force control means 34, when in a rest position, to bias locking pawl 50 in a position of non-engagement with locking ratchet 20. Control spring means 126 is situated between fixed support member 124 and a spring stop 128 on control means 34.

Figure 5:
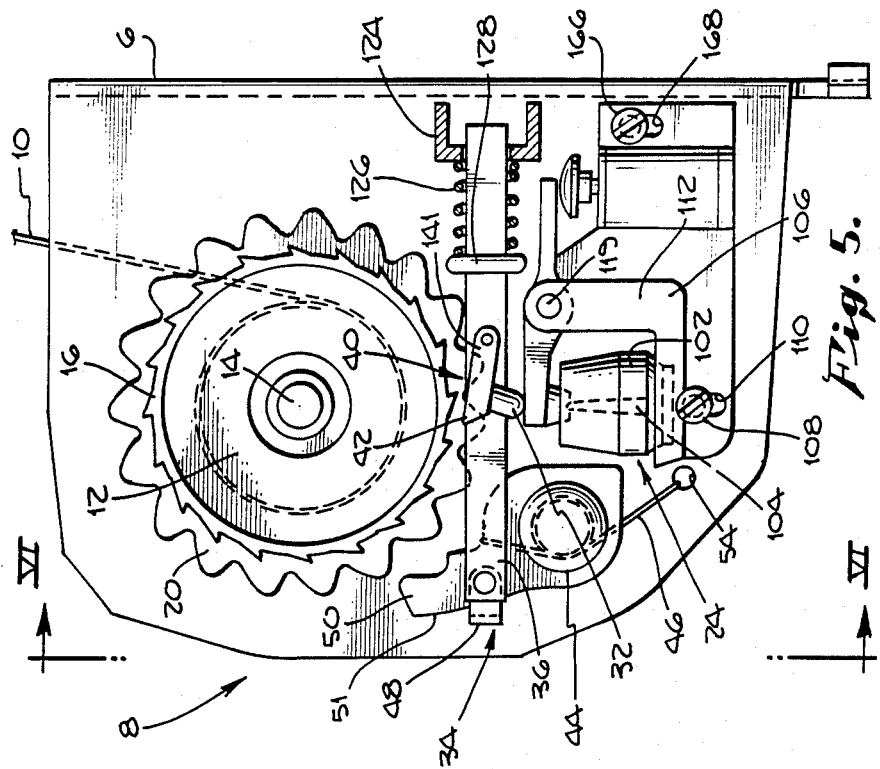
FIG. 5 is a sectional view of a first alternative exemplary embodiment of a synchronized safety belt retractor with structural control means in accordance with the present invention.
Figure 6:
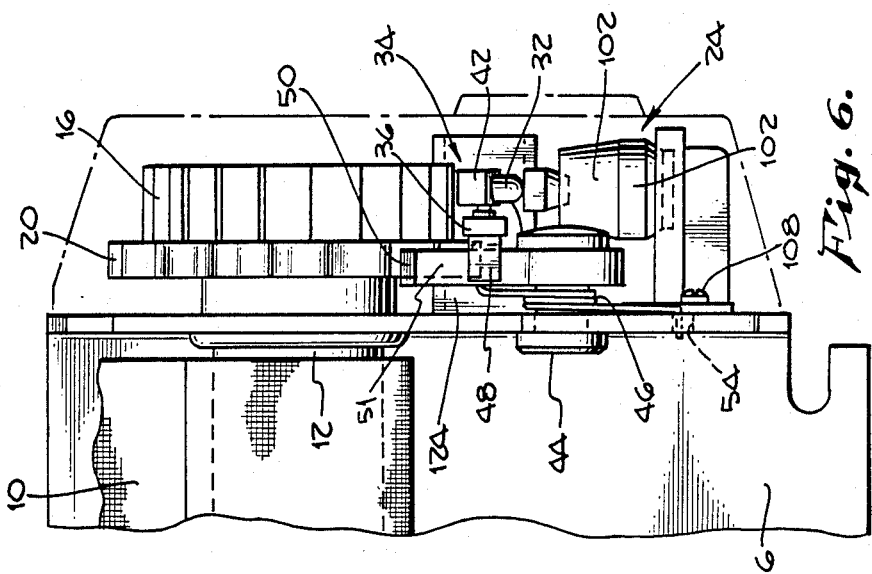
FIG. 6 is a side view of the synchronized safety belt retractor with structural control means of FIG. 5 taken therein along plane VI—VI.

Inertia sensor means 24 in the exemplary embodiment of FIG. 5 is responsive to changes in vehicle momentum. A pendulum support 106 is provided for supporting an inertia sensing pendulum 102 and an enclosed actuator shaft 104 in retractor housing 8. Pendulum support 106 further may have a mounting arm 112 and a translator arm 118 including a translator pivot 119. It should be noted that inertia adjusting screw 108 and slot 110 provide for raising and lowering of inertia sensing pendulum 102 thereby allowing for sensitivity and tolerance adjustments. A vehicle inertia sensing means of the type discussed immediately above has been disclosed in U.S. Pat. No. 4,018,400.

Figure 7:
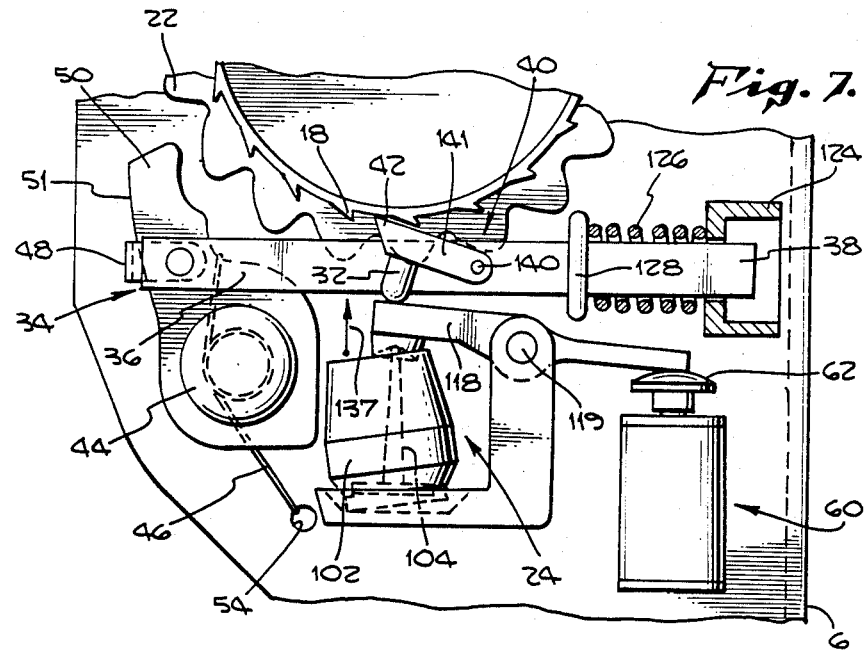
FIG. 7 is a partial sectional view as in FIG. 5 showing the exemplary synchronized retractor in programming ratchet engaged condition.

As is best seen in FIG. 7, movement of a predetermined type by the inertia sensing means 24 results in translator arm 118 pivoting about translator pivot 119 forcing actuator means 32 upwards (as indicated by directional arrow 137). Actuator means 32 pivotally turns actuator mounting arm 141 of pawl mounting means 40 about pin joint 140. The rotation of pawl mounting means 40 moves programming pawl 42 into engagement with the teeth 20 of programming ratchet 16.

Figure 8:
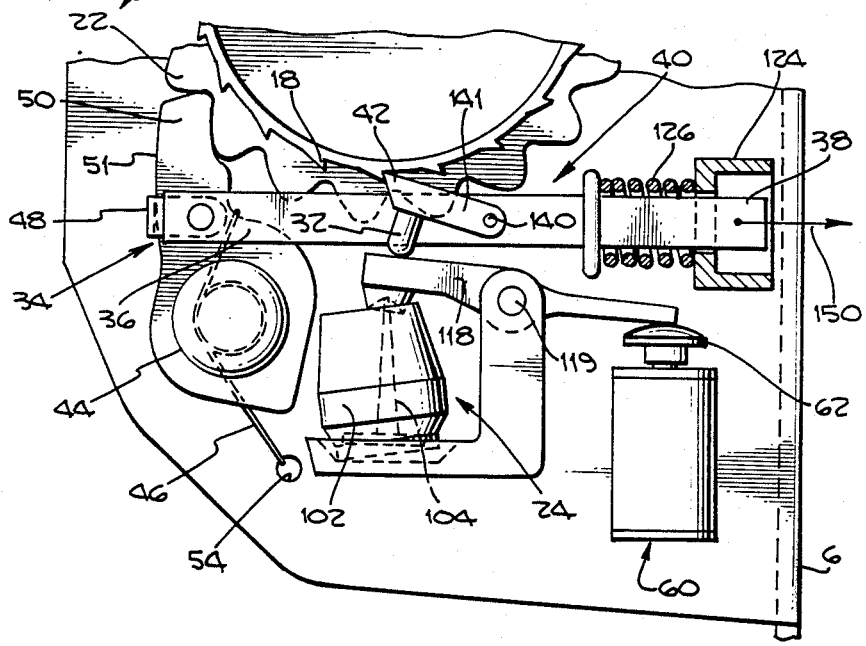
FIG. 8 is a view as in FIG. 7 showing the exemplary synchronized retractor in locking ratchet engaged and spool locked condition.

Referring now to FIG. 8, control means 34 is forced into a generally horizontal movement by the counter-clockwise rotation of programming ratchet 16. Second end 38 is slideably received by fixed support member 124 and consequently control means 34 is also forced against arm spring 126. Movement of control means 34 causes first end 36 to pivot and locking pawl 50 is then brought into synchronized engagement with locking ratchet 18 by retaining means 48, as was described in detail with respect to FIGS. 1 through 4.

In this the first alternative embodiment, solenoid means 60 is adjustably mounted by solenoid screw 166 at solenoid slot 168. Adjustable mounting affords sensitivity adjustments with respect to solenoid means 60 prevention or biasing of engagement of the retractor mechanism. Blunt end 62 may be caused to contact the rear portion of translator arm 118, thereby forcing translator arm 118 in a downward motion as it rotates about translator pivot 119. Actuator means 32, being in contact with the front portion of translator arm 118, pivots downward as well. Pawl mounting means 40 pivots about actuator arm 141 on the mid-portion of control means 34. This movement of pawl mounting means 40 precludes programming pawl 42 from engaging with programming ratchet 16, and belt webbing 10 may be continually protracted.

SECOND ALTERNATIVE EXEMPLARY EMBODIMENT

Referring now to FIGS. 9 through 12, a second alternative embodiment of a synchronized safety belt retractor with structural control means in accordance with the present invention will be explained. The retractor parts in the present embodiment which are the same as those discussed with regard to the earlier embodiments of FIGS. 1 through 8 are given the same reference numerals as before. Preliminarily it is noted that in this embodiment actuator means 32 is a knob mounted upon inertia sensor means 24 and abutting up therefrom. Inertia sensor means 24 is of the form generally indicated in the first alternative exemplary embodiment. Control means 34 is a plate having a polygonal configuration with a programming portion 204, a locking portion 206 and a stabilizing portion 208. Control means 34 also includes a retaining means 48 which comprises an integral first lip on the locking portion 206 of control means 34. A pawl mounting means 40 is provided for mounting programming pawl 42 on programming portion 204. The pawl mounting means 40 further comprises an actuator mounting arm 141 pivotally connected to the programming portion 204 of control means 34. A central portion of control means 34 is rotatably mounted on spool shaft 14 and is overlying programming ratchet 16 and locking ratchet 20.

Referring now to FIG. 11, actuator mounting arm 141 pivots about pin joint 140 in response to an upward force from actuator means 32 (as shown by directional arrow 237) caused by sensor means 24. Movement of actuator mounting arm 141 causes programming pawl 42 to engage with the teeth 18 of programming ratchet 16. Further counter-clockwise rotation of programming ratchet 16 causes control means 34 to rotate about shaft 14. Stabilizing portion 208 of control means 34 helps provide even rotational movement about shaft 14.

Referring next to FIG. 12, rotation of control means 34 moves locking portion 206 in a substantially counter-clockwise direction (as shown by directional arrow 239). Retaining means 48, the integral lip of locking portion 206 (best shown in FIG. 10), contacts edge 51 of locking pawl 50. Locking pawl 50, biased to a position of non-engagement by a spring biasing means 46, is forced by driving means 48 from its rest position to engage with teeth 22 of locking ratchet 20. Locking pawl 50 and locking ratchet 18 engagement prevents further spool rotation and belt protraction.

Figure 9:
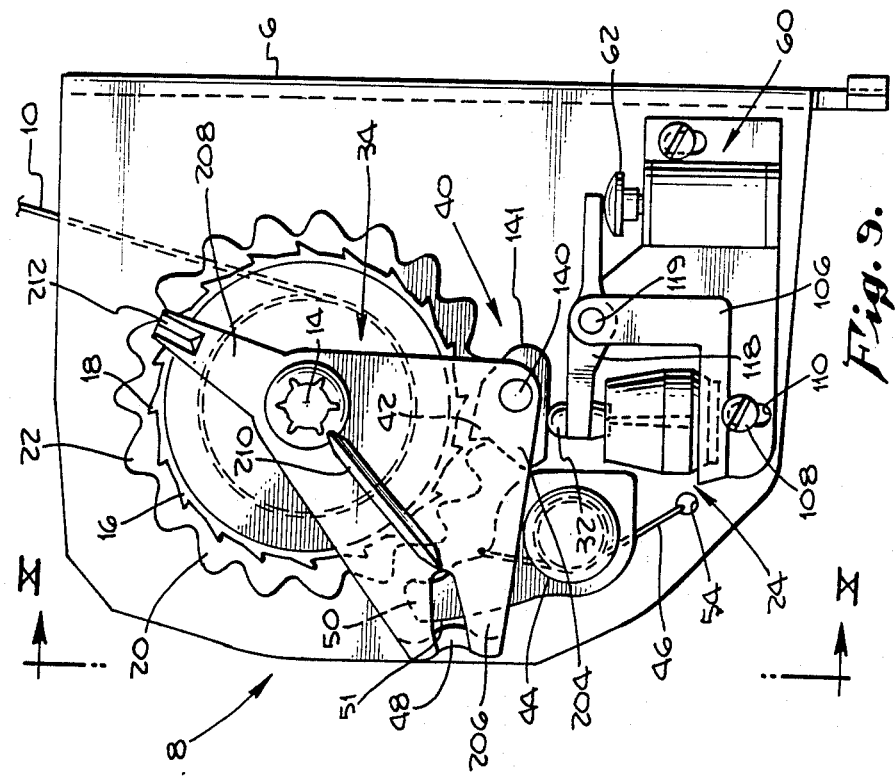
FIG. 9 is a sectional view of a second alternative exemplary embodiment of a synchronized safety belt retractor with structural control means in accordance with the present invention.
Figure 10:
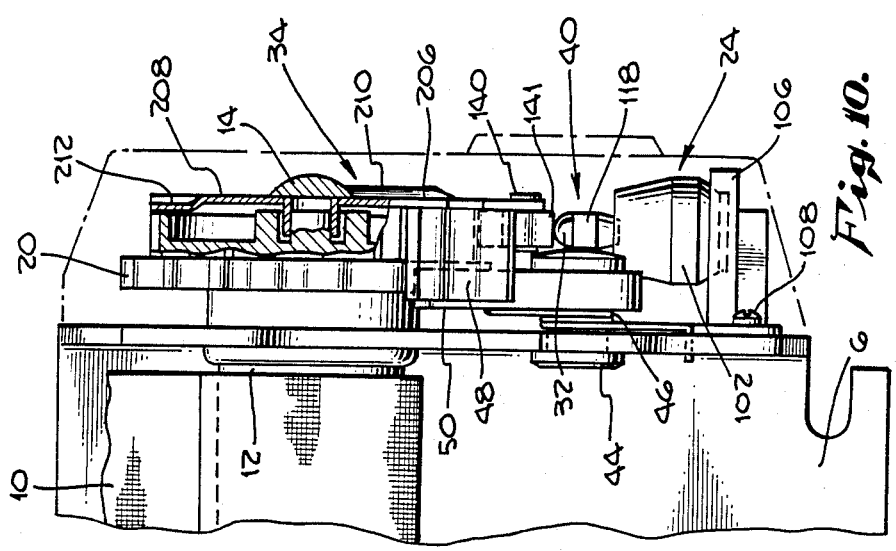
FIG. 10 is a side view of the structural control means of FIG. 9 taken therein along plane X—X.
Figure 13:
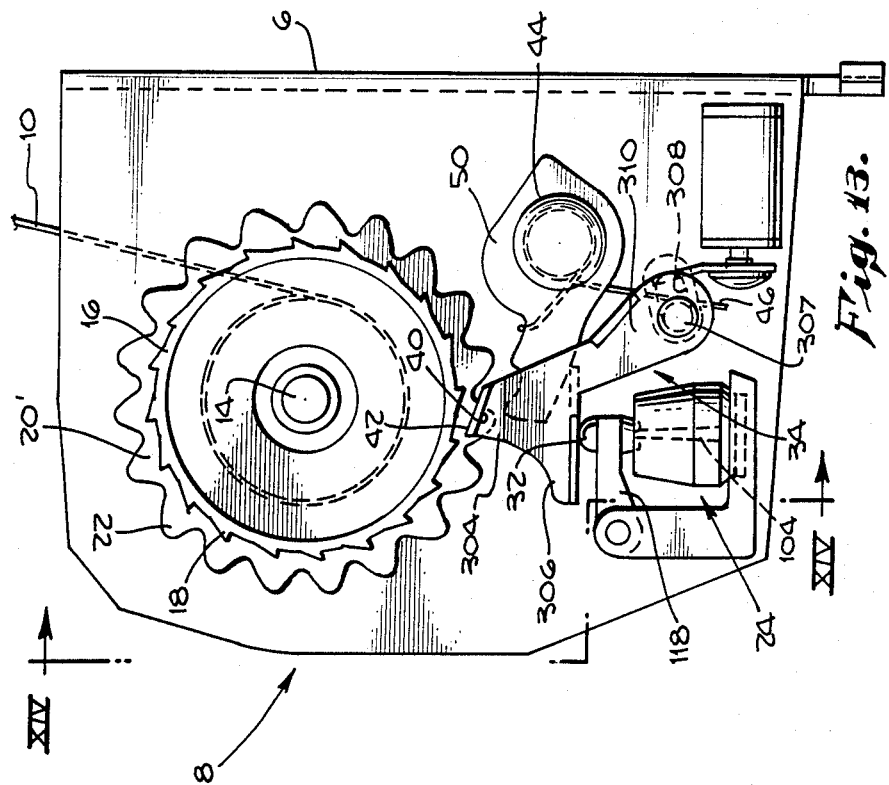
FIG. 13 is a sectional view of a third alternative embodiment of the synchronized safety belt retractor with structural control means in accordance with the present invention.
Figure 14:
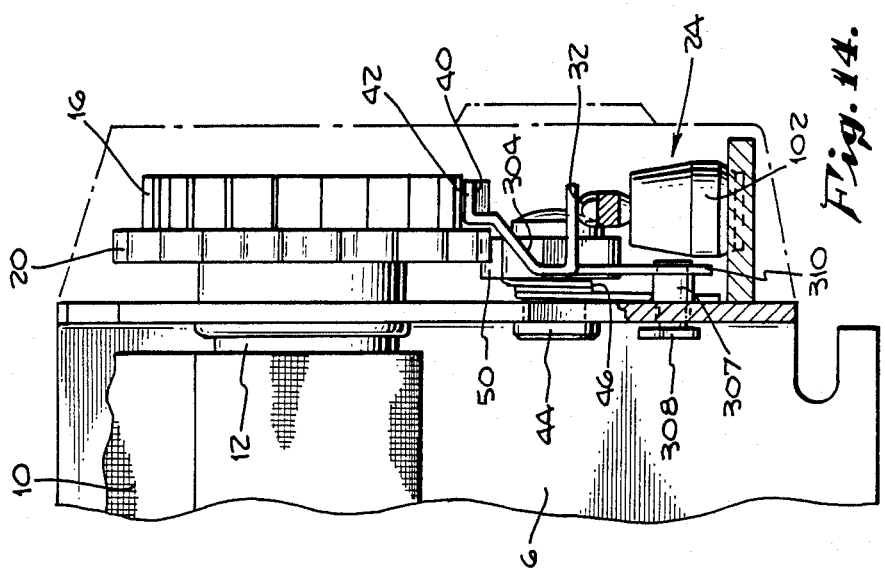
FIG. 14 is a side view of the structural control means of FIG. 13 taken therein along plane XIV—XIV.

An enforcement means 210 on control means 34 provides for stress distribution and avoidance of placing significant force factors on the ratchets 16 and 18 and pawl 42 and 50. As seen in FIGS. 9 and 10, the exemplary enforcement means 210 comprises an integral and longitudinally extending protrusion along the control means 34. It should be noted that reinforcement recess 212 and enforcement means 210 may be altered as the shape of control means 34 is varied. 12 gives additional rigidity to the end of stabilizing portion 208. Retaining means 48 as seen in FIG. 11, in this embodiment comprises a member 214 formed integrally of control means 34.

Solenoid means 60 of this particular exemplary embodiment is mounted and functionally operated similarly to the solenoid means 60 as described in detail with the first alternative embodiment. Rear portion of translator arm 118 is raised by blunt end 62; and, as translator arm 118 rotates about translator pivot 119, the front end of translator arm 118 is biased against actively moving upward. Consequently, actuator means 32 is prevented from undergoing the requisite upward motion necessary to contact pawl mounting means 40 on programming portion 204 of control means 34. Thus, programming pawl 42 will not engage programming ratchet 16 and belt 10 may protract freely.

THIRD ALTERNATIVE EXEMPLARY EMBODIMENT

A third alternative embodiment of the control means safety belt retractor in accordance with the present invention is illustrated in FIGS. 13 through 16. Reference numerals employed in these figures which are the same as those employed hereinbefore indicate the same parts here as before. Control means 34 is a polygonal dog, shown in this embodiment to be of a substantially F-shaped configuration (best shown in FIG. 14). Control means 34 has a programming portion 304, a locking portion 306 and a lower dog portion 310.

A pawl mounting means 40 is provided for mounting the programming pawl 42 on control means 34. Specifically, pawl mounting means 40 comprises an integral lip on the programming portion 304 of control means 34. Lower dog portion 310 is pivotally and slideably attached to retractor housing 8 (best shown in FIG. 14) at slot 308 by dog pin 307.

Control means 34 also includes a retaining means which comprises an integral lip of locking portion 306. Locking portion 306 is supported by actuator means 32. Actuator means 32 is mounted adjacent translator arm 118 of sensor means 24. Sensor means 24 is substantially similar to the sensor means described in the first alternative embodiment.

Figure 15:
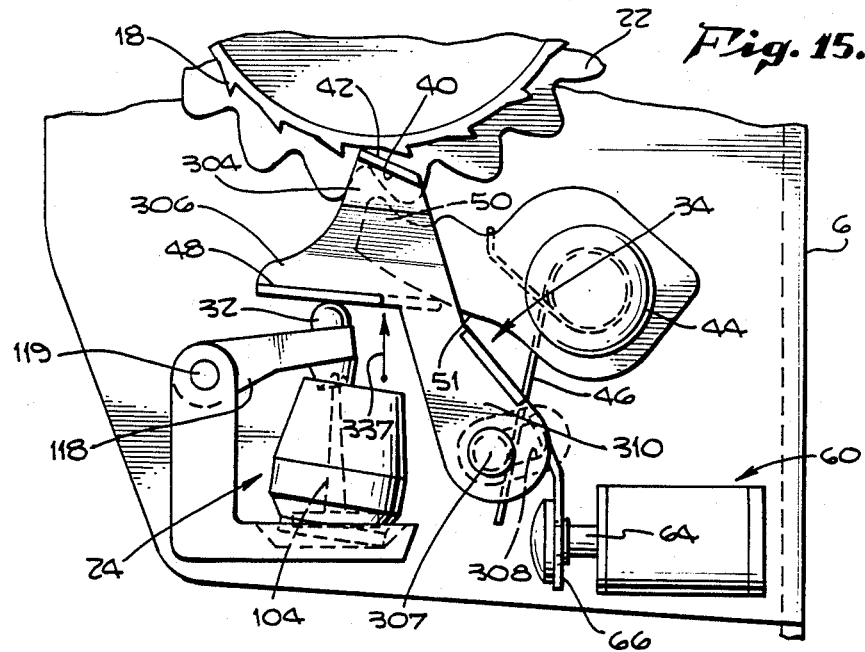
FIG. 15 is a partial sectional view as in FIG. 13 showing the exemplary synchronized retractor in programming ratchet engaged condition.

Referring next to FIG. 15, sensor means 24, in response to accelerations of more than a predetermined amount, causes actuator means 32 to move upward (indicated by directional arrow 337). The upward motion of actuator means 32 places a generally vertical force upon locking portion 306 of control means 34. Upward motion of locking portion 306 moves programming portion 304 toward programming ratchet 16. Consequently, programming pawl 42, mounted by pawl mounting means 40 on programming portion 304, engages the teeth 18 of programming ratchet 16. As was seen in the prior alternative embodiments, protraction of belt webbing 10 causes programming ratchet 16 to rotate about shaft 14. The counterclockwise rotation of programming ratchet 16, now engaged with programming pawl 42, pivots control means 34 about lower dog portion 310.

Figure 16:
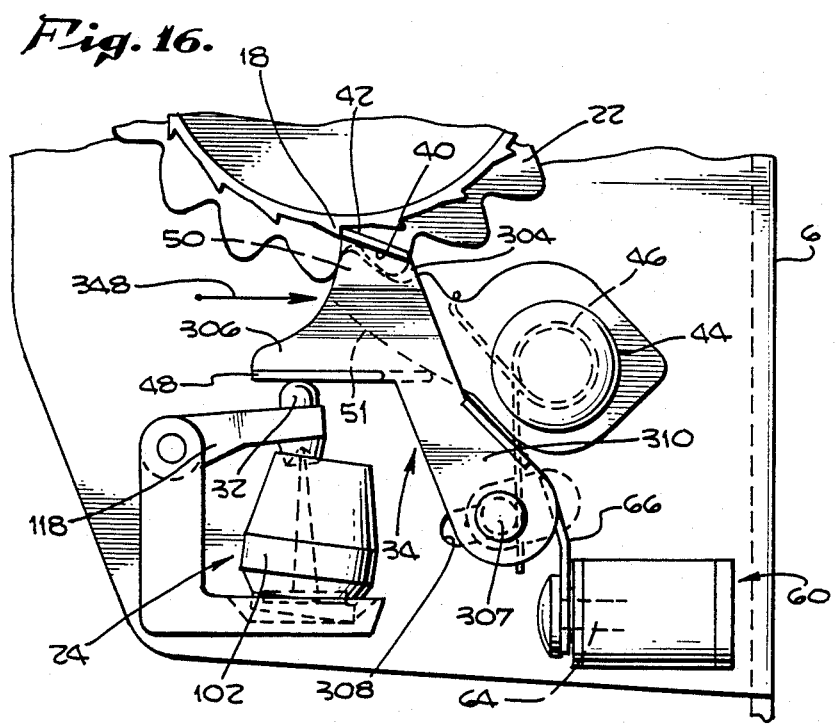
FIG. 16 is a partial sectional view as in FIG. 15 showing the exemplary synchronized retractor in locking ratchet engaged and spool locked condition.

Referring finally to FIG. 16, the pivotal movement of control means 34 causes locking portion 306 to slideably move over actuator means 32. As aforementioned, the lip of locking portion 306 is retaining means 48. The pivotal movement of control means 34 about lower dog portion 310 urges retaining means 48 into contact with edge 51 of locking pawl 50 (as indicated by directional arrow 348). Locking pawl 50 is biased to a position of non-engagement by a spring biasing means 46.

As control means 34 pivots further about lower dog portion 310, retaining means 48 forces locking pawl 50 from its position of non-engagement into a position of engagement with the teeth 22 of locking ratchet 20. Spool rotation and belt protraction are precluded once the locking pawl 50 is in contact with the teeth 22 of locking ratchet 20. Finally, solenoid means 60 also has a solenoid arm 66 mounted on stem 64. Solenoid arm 66 is so positioned that activation of solenoid means 60 causes solenoid arm 66 to come into contact with the lower dog portion 310 of control means 34 and prevent pivotal rotation about dog pin 307 in slot 308. Limitation of rotation of control means 34 prevents pawl and ratchet engagement and allows free, unrestricted belt protraction.

Having thus described a preferred exemplary embodiment of a structural control means for a synchronized safety belt retractor in accordance with the present invention, and three alternative exemplary embodiment thereof, it should be apparent to those skilled in the art that various additional objects and advantages have been attained by the within invention and that a variety of modifications, adaptions and equivalent constructions can be made within the scope and spirit of the present invention, being limited only by the appended claims.

I claim:

1. A structural control locking means for a safety belt retractor having a belt storage spool rotatably mounted on a shaft, said spool having a programming ratchet and a locking ratchet, each ratchet having a respective plurality of teeth, and a programming pawl and a locking pawl for preventing spool rotation when engaged with said teeth by the structural control locking means comprising the provision of:

an actuator means for initiating movement of said programming pawl into engagement with said teeth of said programming ratchet;

sensor means for moving said actuator means in response to changes in vehicle inertia of more than a predetermined amount;

a control means of a substantially bar-shaped configuration having first and second ends and including a pawl mounting means for mounting said programming pawl on said control means, said control means being pivotally connected only to said locking pawl, and means for mounting said control means for horizontal movement relative said programming ratchet, said locking ratchet and said actuator means, whereby rotation of said programming ratchet after engagement of said programming pawl with said programming ratchet moves said control means horizontally causing synchronized engagement of said locking pawl with said locking ratchet thereby preventing further belt protraction.

2. The structural control locking means of claim 1 wherein said bar-shaped configuration control means has a generally horizontal orientation, said first end is pivotally connected to said locking pawl, said second end rests on said actuator means, is horizontally slideably movable over said actuator means and is pivotally supported thereon during programming pawl engagement with said programming ratchet, said means for mounting said control means comprising said first end being connected to said pawl and said second end being rested on said actuator means.

3. A structural control locking means for a safety belt retractor having a belt storage spool rotatably mounted on a shaft, said spool having a programming ratchet and a locking ratchet, each ratchet having a respective plurality of teeth, and a programming pawl and a locking pawl for preventing spool rotation when engaged with said teeth by the structural control locking means comprising the provision of:
   an actuator means for initiating movement of said programming pawl into engagement with said teeth of said programming ratchet;
   sensor means for moving said actuator means in response to changes in vehicle inertia of more than a predetermined amount;
   a control means of a substantially bar-shaped configuration having first and second ends and including a pawl mounting means for mounting said programming pawl on said control means, said first end being pivotally connected to said locking pawl by a retaining means for drivingly engaging said locking pawl with said teeth of said locking ratchet, whereby rotation of said programming ratchet after engagement of said programming pawl with said programming ratchet moves said control means causing synchronized engagement of said locking pawl with said locking ratchet through movement of said retaining means thereby preventing further belt protraction; and
   wherein said bar-shaped configuration control means has a generally horizontal orientation, a mid-portion disposed above said sensor means, said second end slideably receivable in a fixed support member, and a control spring means biasing said control means to move said locking pawl away from said locking ratchet.

4. The structural control locking means of claim 3 wherein said pawl mounting means further comprises:
   an actuator mounting arm pivotally connected to said mid-portion of said control means and providing rotational movement of said programming pawl toward engagement with said programming ratchet in response to movement of said sensor means.

5. The structural control locking means of claim 3 wherein said locking means further comprises:
   a solenoid means for selectively preventing movement of said actuator means.

6. A structural control locking means for a safety belt retractor having a belt storage spool rotatably mounted on a shaft, said spool having a programming ratchet and a locking ratchet, each ratchet having a plurality of teeth, and a programming pawl and a locking pawl for preventing spool rotation when engaged with said teeth by the structural control locking means comprising the provision of:
   an actuator means for initiating movement of said programming pawl into engagement with said teeth of said programming ratchet;
   sensor means for moving said actuator means in response to changes in vehicle inertia of more than a predetermined amount;
   a control means being a dog of a polygonal configuration having a programming portion and a locking portion and including a retaining means comprising an integral first lip on said locking portion for drivingly engaging said locking pawl with the teeth of said locking ratchet, and a pawl mounting means for mounting said programming pawl on said programming portion, whereby rotation of the spool shaft after engagement of said programming pawl and programming ratchet is translated by said control means to synchronize engagement of said locking pawl and locking ratchet thereby preventing further belt protraction; and
   wherein said control means has a lower dog portion slideably and pivotally mounted on said retractor housing, said first lip on said locking portion situated adjacent to said actuator means, and said pawl mounting means comprising an integral lip of said programming portion of said control means and providing for engagement of said programming pawl with said programming ratchet in response to movement of said first lip of said control means by said actuator means.

7. A structural control locking means for a safety belt retractor having a belt storage spool rotatably mounted on a shaft, said spool having a programming ratchet and a locking ratchet, each ratchet having a plurality of teeth, and a programming pawl and a locking pawl for preventing spool rotation when engaged with said teeth by the structural control locking means comprising the provision of:
   an actuator means for initiating movement of said programming pawl into engagement with said teeth of said programming ratchet;
   sensor means for moving said actuator means in response to changes in vehicle inertia of more than a predetermined amount;
   a control means being a dog of a polygonal configuration having a programming portion and a locking portion and including a retaining means comprising an integral first lip on said locking portion for drivingly engaging said locking pawl with the teeth of said locking ratchet, and a pawl mounting means for mounting said programming pawl on said programming portion, whereby rotation of the spool shaft after engagement of said programming pawl and programming ratchet is translated by said control means to synchronize engagement of said locking pawl and locking ratchet thereby preventing further belt protraction; and
   wherein said control means has a central portion rotatably mounted about said spool shaft and overlying said programming ratchet and said locking ratchet, and a stabilizing portion extending from said center portion.

8. The structural control locking means of claim 7, wherein said stabilizing portion further comprises a reinforcement recess for structural integrity.

* * * * *